(12) United States Patent
Zhou et al.

(10) Patent No.: US 12,254,490 B1
(45) Date of Patent: *Mar. 18, 2025

(54) COMBINING CONTENT WITH A SEARCH RESULT

(71) Applicant: Google LLC, Mountain View, CA (US)

(72) Inventors: Yunkai Zhou, Los Altos, CA (US); Jennifer J. Huang, San Francisco, CA (US); Alexander Collins, San Francisco, CA (US); Ian James Leader, Zurich (CH); Conrad Wai, San Francisco, CA (US); Christopher Souvey, Santa Cruz, CA (US); Lewis Denizen, Mountain View, CA (US); Gaurav Garg, Palo Alto, CA (US); Awaneesh Verma, San Francisco, CA (US); Emily Kay Moxley, San Francisco, CA (US); Jeremy Silber, New York, NY (US); Daniel Amaral de Medeiros Rocha, New York, NY (US); Alexander Fischer, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,626

(22) Filed: Jun. 14, 2023

Related U.S. Application Data

(63) Continuation of application No. 17/153,552, filed on Jan. 20, 2021, now Pat. No. 11,720,920, which is a
(Continued)

(51) Int. Cl.
*G06F 16/9537* (2019.01)
*G06F 16/2457* (2019.01)
*G06Q 30/0251* (2023.01)

(52) U.S. Cl.
CPC ... *G06Q 30/0256* (2013.01); *G06F 16/24578* (2019.01); *G06F 16/9537* (2019.01)

(58) Field of Classification Search
CPC ............ G06Q 30/0256; G06F 16/9537; G06F 16/24578
(Continued)

(56) References Cited

U.S. PATENT DOCUMENTS 7,831,685 B2   11/2010   Dai et al.
7,849,104 B2   12/2010   Sun et al.
(Continued)

FOREIGN PATENT DOCUMENTS

EP          1589443        10/2005
WO     WO 2010117675       10/2010

OTHER PUBLICATIONS

Joshi et al., "Contextual Advertising through Entity Extraction," Int'l J Engineering Adv. Technol., 2013, 2(3):579-582.
(Continued)

*Primary Examiner* — Joshua Bullock
(74) *Attorney, Agent, or Firm* — Fish & Richardson P.C.

(57) ABSTRACT

Methods, systems, and apparatus include computer programs encoded on a computer-readable storage medium, including a method for providing content. Search results responsive to a query are identified including a first search result in a top set of search results, the first search result associated with a first entity. A first eligible content item is identified for presentation along with the search results, the first eligible content item associated with the first entity. A combined content item is identified that is a combination of the first search result and first eligible content item and is to be presented as a search result responsive to the query. The combined content item is augmented including: identifying entities related to the first entity, identifying content items
(Continued)

that are associated with the related entities, selecting at least one identified content item, and using content from the selected content items to augment the combined content item.

17 Claims, 6 Drawing Sheets

Related U.S. Application Data continuation of application No. 15/076,175, filed on Mar. 21, 2016, now Pat. No. 10,929,883, which is a continuation of application No. 13/943,281, filed on Jul. 16, 2013, now Pat. No. 9,298,779.

(58) Field of Classification Search
USPC .......................................................... 707/731
See application file for complete search history.

(56) References Cited

U.S. PATENT DOCUMENTS

| | | | |
|---|---|---|---|
| 7,987,194 B1 | 7/2011 | Walker et al. | |
| 8,122,016 B1* | 2/2012 | Lamba | G06F 16/90332 |
| | | | 707/723 |
| 8,171,021 B2 | 5/2012 | Guha et al. | |
| 8,364,525 B2 | 1/2013 | Kothiwal et al. | |
| 2006/0206479 A1 | 9/2006 | Mason | |
| 2007/0244872 A1* | 10/2007 | Hancock | G06F 16/955 |
| 2010/0324993 A1* | 12/2010 | Kacholia | G06F 16/951 |
| | | | 707/706 |
| 2011/0099062 A1 | 4/2011 | Sah | |
| 2012/0047134 A1 | 2/2012 | Hansson et al. | |
| 2012/0254149 A1* | 10/2012 | Ramsay | G06Q 30/0256 |
| | | | 707/E17.108 |
| 2012/0330949 A1 | 12/2012 | Diab et al. | |
| 2013/0018723 A1* | 1/2013 | Khanna | G06Q 30/0241 |
| | | | 705/14.49 |
| 2013/0091013 A1 | 4/2013 | Wang et al. | |
| 2014/0006129 A1* | 1/2014 | Heath | G06Q 30/02 |
| | | | 705/14.23 |
| 2015/0026144 A1 | 1/2015 | Wai et al. | |
| 2016/0378749 A1* | 12/2016 | Lee | G06F 16/434 |
| | | | 707/731 |

OTHER PUBLICATIONS

International Search Report and Written Opinion in International Appln. No. PCT/US2014/045974, mailed on Oct. 23, 2014, 13 pages.

* cited by examiner

COMBINING CONTENT WITH A SEARCH RESULT

CROSS-REFERENCE TO RELATED APPLICATION

This application is a continuation of U.S. application Ser. No. 17/153,552, filed on Jan. 20, 2021, which is a continuation of U.S. application Ser. No. 15/076,175, now U.S. Pat. No. 10,929,883, filed on Mar. 21, 2016, which is a continuation of U.S. application Ser. No. 13/943,281, now U.S. Pat. No. 9,298,779, filed on Jul. 16, 2013, the disclosure of each is considered part of and are incorporated by reference in the disclosure of this application.

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can be provided to a user device such as a personal computer (PC), a smartphone, a laptop computer, a tablet computer, or some other user device.

SUMMARY

In general, one innovative aspect of the subject matter described in this specification can be implemented in methods that include a computer-implemented method for providing content. The method includes receiving a search query. The method further includes identifying search results responsive to the query including a first search result in a top set of search results wherein the first search result is associated with a first entity. The method further includes identifying a first eligible content item based on the search results for presentation along with the search results, the first eligible content item being associated with the first entity. The method further includes identifying a combined content item that is a combination of the first search result and the first eligible content item and is to be presented as a search result responsive to the query. The method further includes augmenting the combined content item including: identifying one or more entities related to the first entity, identifying one or more content items from an inventory of content items that are associated with the one or more identified related entities, selecting at least one of the identified one or more content items based on a selection criteria, and using content from the selected at least one identified one or more content items to augment the combined content item.

These and other implementations can each optionally include one or more of the following features. The first entity can be a brand. The first eligible content item can be sponsored by an owner of the brand. The one or more related entities can be commercially related to the brand. The one or more commercially related entities can be retailers for the brand. Identifying one or more related entities can include using a graph of related entities to determine one or more commercially related entities. Identifying one or more content items from an inventory of content items that are associated with the one or more identified related entities can include identifying one or more content items that are sponsored by the one or more identified related entities. Selecting can include conducting an auction and using selection criteria that includes performance information related to either the one or more related entities or the identified one or more content items. Augmenting can include adding a link to a landing page associated with the one or more content items. Augmenting can include adding a text advertisement sponsored by the one or more related entities. Augmenting can include determining a format for content to be added and adding the one or more content items in accordance with the determined format.

In general, another innovative aspect of the subject matter described in this specification can be implemented in computer program products that include a computer program product tangibly embodied in a computer-readable storage device and comprising instructions. The instructions, when executed by one or more processors, cause the processor to: receive a search query; identify search results responsive to the query including a first search result in a top set of search results wherein the first search result is associated with a first entity; identify a first eligible content item based on the search results for presentation along with the search results, the first eligible content item being associated with the first entity; identify a combined content item that is a combination of the first search result and the first eligible content item and is to be presented as a search result responsive to the query; and augment the combined content item including: identifying one or more entities related to the first entity, identifying one or more content items from an inventory of content items that are associated with the one or more identified related entities; selecting at least one of the identified one or more content items based on a selection criteria; and using content from the selected at least one identified one or more content items to augment the combined content item.

These and other implementations can each optionally include one or more of the following features. Augmenting can include adding a link to a landing page associated with the one or more content items. Augmenting can include adding a text advertisement sponsored by the one or more related entities. Augmenting can include determining a format for content to be added and adding the one or more content items in accordance with the determined format.

In general, another innovative aspect of the subject matter described in this specification can be implemented in systems, including a content management system. The system includes a content identification engine that evaluates terms and phrases in a received query to identify content responsive to the request. The system further includes an entity/brand determination engine that determines when at least one of the eligible content items identified by the content identification engine is associated with a same entity/brand as an entity/brand associated with a first search result of the search results. The system further includes a content item combination engine that combines the first search result and one of the determined at least one eligible content items into a combined content item. The system further includes a request handler that handles requests for content received by the content management system. The system further includes one or more processors and one or more memory elements including instructions. The instructions, when executed, cause the one or more processors to: receive a search query; identify search results responsive to the query including a first search result in a top set of search results wherein the first search result is associated with a first entity; identify a first eligible content item based on the search results for presentation along with the search results, the first eligible content item being associated with the first entity; identify a combined content item that is a combination of the first search result and the first eligible content item and is to be presented as a search result responsive to the query; and augment the combined content item including: identifying one or more entities related to the first entity, identifying one or more content items from an inventory of content items that are associated with the one or more identified related entities; selecting at least one of the identified one or more content items based on a selection criteria; and using content from the selected at least one identified one or more content items to augment the combined content item.

These and other implementations can each optionally include one or more of the following features. Augmenting can include adding a link to a landing page associated with the one or more content items. Augmenting can include adding a text advertisement sponsored by the one or more related entities. Augmenting can include determining a format for content to be added and adding the one or more content items in accordance with the determined format. The first entity can be a brand.

Particular implementations may realize none, one or more of the following advantages. Combined content items (e.g., a combined search result entry) can be automatically created using content from a search result associated with a brand and a content item (e.g., advertisement) associated with the same brand. Users can be presented with a combined content item that may be more interesting because the content item includes content from different sources. The combined content item can also be augmented with other information, such as information (e.g., content) from retailers, suppliers, or other content sponsors that are associated with the brand or entity. In some implementations, retailer information can be turned into actionable links that users can use to access brand-related or entity-related content provided by the other content sponsors.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems, methods, computer program products and mechanisms for creating a combined content item that combines content from a search result and a content item that are both associated with the same entity (e.g., brand, sponsor or other entity). For example, the search result can be one of (e.g., the first or top search result in) search results that are provided in response to a query. The content item (e.g., an advertisement) can be selected (based on being associated with the same brand) from one or more eligible content items that are also identified, based at least in part, on a received query. The combined content item that is created can be presented with the search results, e.g. as the first search result.

In some implementations, combined content items can incorporate content from content sponsors of related entities. The related entities can be related, for example, to an entity associated with a content item that matches selection criteria associated with a received request. In an example, in response to a received search query, search results responsive to the query can be identified, including identifying a first search result in a top set of search results. The first search result can be associated with a first entity. A first eligible content item (that is associated with the first entity) can be identified based on the search results for presentation along with the search results. A combined content item can be identified that is a combination of the first search result and the first eligible content item and that is to be presented as a search result responsive to the query. The combined content item can be augmented. For example, one or more entities related to the first entity can be identified, and one or more content items can be identified from an inventory of content items that are associated with the one or more identified related entities. At least one of the identified one or more content items can be selected for use in augmenting the combined content item. The selected at least one identified one or more content items can be added in whole or part to the combined content item or used as the basis for content that is augmented (e.g., actionable links).

Figure 1:
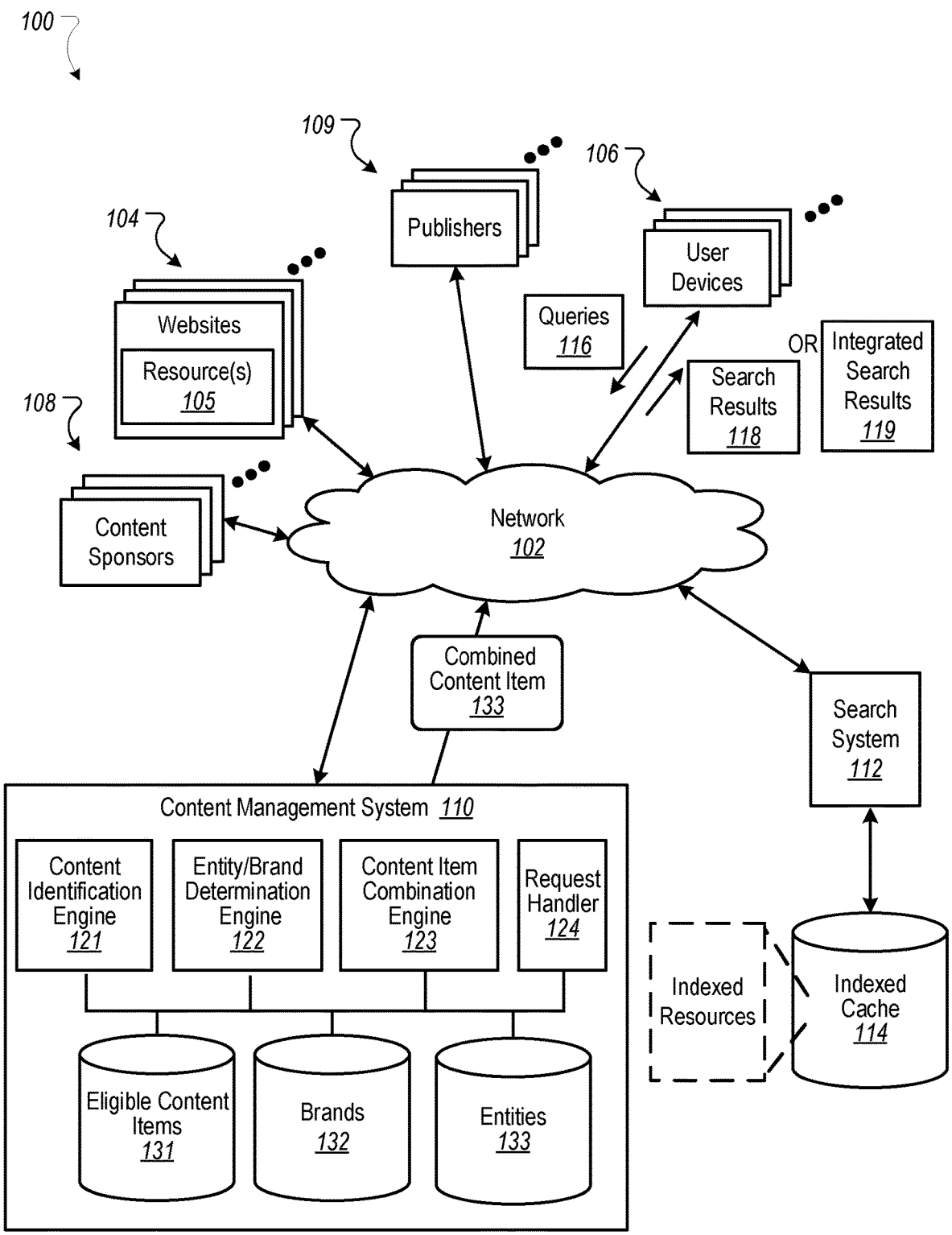
FIG. 1 is a block diagram of an example environment for delivering content.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, in response to a request for content (e.g., a search query 116), the content management system 110 can provide a combined content item 133, e.g., as a first search result among the search results 118. The content management system 110 can create the combined content item 133, for example, by combining a top one of the search results 118 with one of the eligible content items 131 that is associated with a same brand as the top one of the search results 118. In some implementations, a content item associated with a same entity (i.e., not necessarily same brand) can be combined with a search result that is associated with the same respective entity. A more detailed description as to how the combined content item 133 is created is included below.

The content management system 110 can include plural engines. A content identification engine 121, for example, can evaluate terms and phrases in query (e.g., the search query 116) received by the content management system 110 to identify content responsive to the request. The content can include at least one eligible content item (e.g., from a data store of eligible content items 131, including advertisements) and search results (e.g., search results 118) that are responsive to the query. In some implementations, the content identification engine 121 can also identify a first search result in a top set of search results that is associated with a brand. As an example, there can be several search results, and some search results can be associated with a specific brand. From the top search results that are associated with the brand and that may be ranked highest as being responsive to the search query 116, for example, the content identification engine 121 can select a top, or best matching, search result. The at least one eligible content item that is identified can include content items that are identified for delivery along with the search results 118 that are responsive to the search query 116.

An entity/brand determination engine 122, for example, can determine when at least one of the eligible content items identified by the content identification engine 121 is associated with a same entity/brand as the entity/brand associated with the first (e.g., top) search result of the search results. For example, one or more of the eligible content items 131 can be advertisements for Example Brand shoes, which can be the same brand that is associated with a top one of the search results 118.

A content item combination engine 123, for example, can combine a first search result and one of the determined at least one eligible content items into a combined content item. For example, to create the combined content item 133, the content item combination engine 123 can combine an identified one (e.g., a top-ranked one) of the search results 118 associated with Example Brand with one of the eligible content items 131 that is also associated with the brand (e.g., an advertisement for Example Brand shoes).

A request handler 124, for example, can handle requests for content received by the content management system 110, and in response to each request, provide one or more content items to the requestor. For example, the request for content can be a request to fill a content item slot on a web page displayed in a browser on the user device 106. In response to the request for content, the request handler 124 can provide a content item, e.g., a shoe advertisement having characteristics that match the characteristics of an advertisement slot on the user device 106. A search system 112 can provide initial search results 118 in response to received search queries 116. The request handler 124, for example, can combine one of the search results and one or more content items in response to the received search query 116 to produce integrated search results 119. The integrated search results 119 can include, for example, the combined content item 133 created by the content item combination engine 123. In some implementations, the combining can occur at the content management system 110. In some implementations, the combining can occur at the user device 106, e.g., in a browser.

The environment 100 can include plural data stores, which can be stored locally by the content management system 110, stored somewhere else and accessible using the network 102, generated as needed from various data sources, or some combination thereof. A data store of eligible content items 131, for example, can include content items (e.g., advertisements) that can be selected by the content management system 110 in response to a content item request, such as a search query 116. A data store of brands 132, for example, can include information about brands that can be used (e.g., by the entity/brand determination engine 122) to determine if different content items are associated with the same brand. The information can include, for example, the name of the brand and any other brand-related indicators, such as brand owner information (e.g., addresses, URLs, phone numbers), model numbers, model names, and other brand-unique and/or brand-identifying information. A data store of entities 133, for example, can include information that can be used to identify one or more entities associated with a content item. The entities 133 can also include information that can be used to identify entities that are related to another entity. The information in the entities 133 can include, for example, associated with each entity: entity name(s), terms (e.g., brands, models and other terms), location information (e.g., a physical address), uniform resource locators (URLs), sponsors (e.g., content sponsors, retailers), and other entity-related information. In some implementations, a list of related entities can be stored in association with a given entity that is an entry in the entities 133. Related entities can be determined in numerous ways. In some implementations, a given entity can specify related entities. In some implementations, related entities can be determined, such as by evaluating received data, such as data related to delivery of content (e.g., ads). Other methods can be used.

In some implementations, content sponsors 108 can be provided with an interface for defining settings for creating combined content items. For example, content sponsors 108 can specify whether or not they want their content items to be combined with a search result and presented to the user as a combined content item. Other settings are possible, such as settings that define the style and/or content of combined content items.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a webpage title, a snippet of text or a portion of an image extracted from the webpage, and the URL of the webpage. Search results pages can also include one or more slots in which other content items (e.g., ads) can be presented. In some implementations, slots on search results pages or other webpages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation). As discussed above, one or more entries from the search results 118 can be combined with one or more eligible content items to create integrated search result 119. The integrated search result 119 can then be delivered responsive to the received query 116.

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection or other interaction with) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a website or webpage, registering on a website, experiencing media, or performing a social action regarding a content item (e.g., an ad), such as republishing or sharing the content item. Other actions that constitute a conversion can also be used.

In some implementations, conversions may be more likely to occur, for example, when a user is presented with a content item that is a combined content item containing content from a search result and content from an advertisement that is related to the search based on being associated with the same brand. For example, the user may be more likely to click on or otherwise interact with a search result if the search result contains advertisement information and other interesting features that may entice the user to interact with the search result in some way.

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that no personally identifiable information can be determined for the user, or a user's geographic location may be generalized where location information is obtained (such as to a city, ZIP code, or state level), so that a particular location of a user cannot be determined.

Figure 2A:
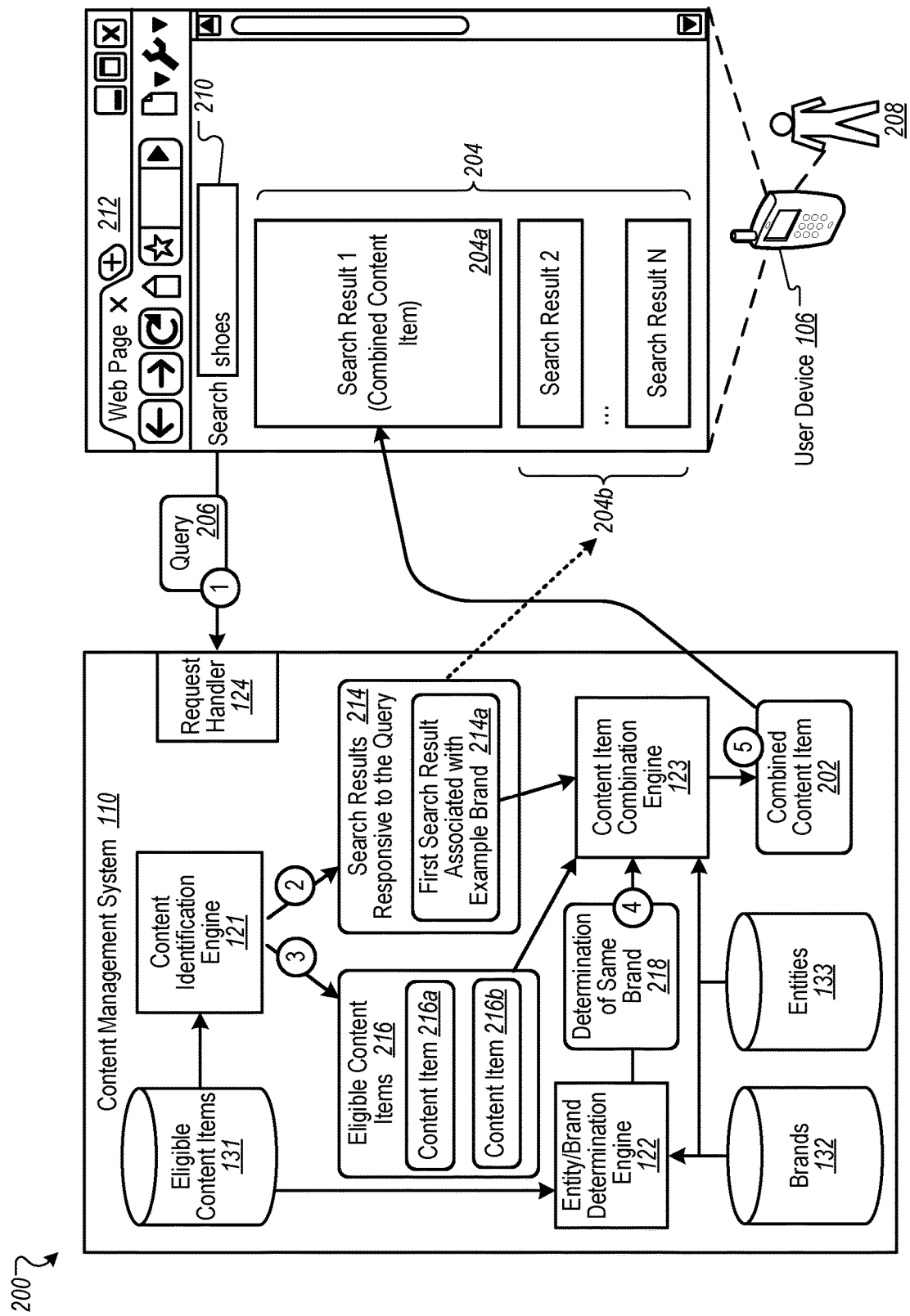
FIG. 2A shows an example system for creating a combined content item using information from a content item associated with a same brand.

FIG. 2A shows an example system 200 for creating a combined content item using information from a content item associated with a same brand. While the example discussed refers to same brand, the system can be used for creating combined content items for other entities. The content management system 110 can provide a combined content item 202 to be presented as a search result entry 204a along with other search results 204. The combined content item 202, for example, can include content from a first search result 214a (responsive to the search query 206) that is combined with content from a content item 216a (also selected based at least in part on the search query 206). A more detailed example follows using an example sequence of stages 1-5.

At stage 1, the content management system 110, for example, can receive a search query 206 (e.g., "shoes") from the user device 106. In some implementations, the search query 206 can be received by the request handler 124. The search query 206 can include one or more terms or phrases and can be entered, for example, by a user 208 in a query control 210 on a web page 212. Other sources of the search query 206 are possible, and the search query 206 can include other selection criteria, e.g., based on the user's location, interests, device type, and/or other criteria.

At stage 2, the content identification engine 121, for example, can identify search results 214 that are responsive to the search query 206. The identified search results 214 can be obtained, for example, using an index such as described above with reference to FIG. 1. The identified search results 214 can include the first search result 214a, e.g., that is associated with Example Brand shoes. The identified search results 214 can also include other search results that may be associated with the same brand, other different brands, or no brand at all. Some search results can be associated with multiple brands.

At stage 3, the content identification engine 121, for example, can also identify eligible content items 216, such as advertisements or other sponsored content, that are to be presented with the search results 214 and that are selected, based at least in part, on the search query 206. The identification can also be based on the search query 206 and other information and/or signals (e.g., the user's current location) that are received from the user device 106 or otherwise derived. The eligible content items 216 that are identified can include, for example, a content item 216a that is one of at least one advertisement for Example Brand shoes. The eligible content items 216 can also include, for example, other advertisements for brands that are different from Example Brand.

At stage 4, the entity/brand determination engine 122, for example, can determine (218), when at least one of the eligible content items 216 is associated with a same brand as the brand associated with the first search result 214a. The determination 218 can be made, for example, using brand information accessed from brands 132. The entity/brand determination engine 122, for example, can make a determination as to whether one or more of the eligible content items 216 is associated with a same brand (e.g., Example Brand shoes) as the first search result 214a. For example, the entity/brand determination engine 122 can determine that content item 216a, e.g., an advertisement for Example Brand shoes, is associated with Example Brand shoes. In some implementations, determining that a search result (or content item) is associated with a brand can include using one or more terms, text or other information from the search result (or content item) to look up corresponding brand names in the brands 132.

At stage 5, the first search result and one of the determined at least one eligible content items are combined into a combined content item, and the combined content item is provided as a search result responsive to the request (310). For example, the content item combination engine 123 can create the combined content item 202 (e.g., a single unit presentable with search results) that is a combination of the first search result 214a and the content item 216a, both of which are associated with the same brand (e.g., Example Brand shoes). In some implementations, a different (e.g., non-first) search result can be combined with the at least one eligible content items into a combined content item.

In some implementations, different factors can be used to decide what information to include in a combined content item. For example, content sponsors 108 may have preferences and/or priorities as to which features of content items are to be included, e.g., images, location information, user reviews, and other information. In some implementations, the content selected to create the combined content item can depend, at least in part, on the device type of the user associated with the query (e.g., search query 206), e.g., so as to produce a combined content item that is fully viewable on the screen of whatever device the user currently has.

The request handler 124, for example, can provide the combined content item 202 to the user device 106 in response to the received search query 206. The combined content item 202 can be displayed, for example, as the search result entry 204a, e.g., the first search result among the search results 204.

Figure 2B:
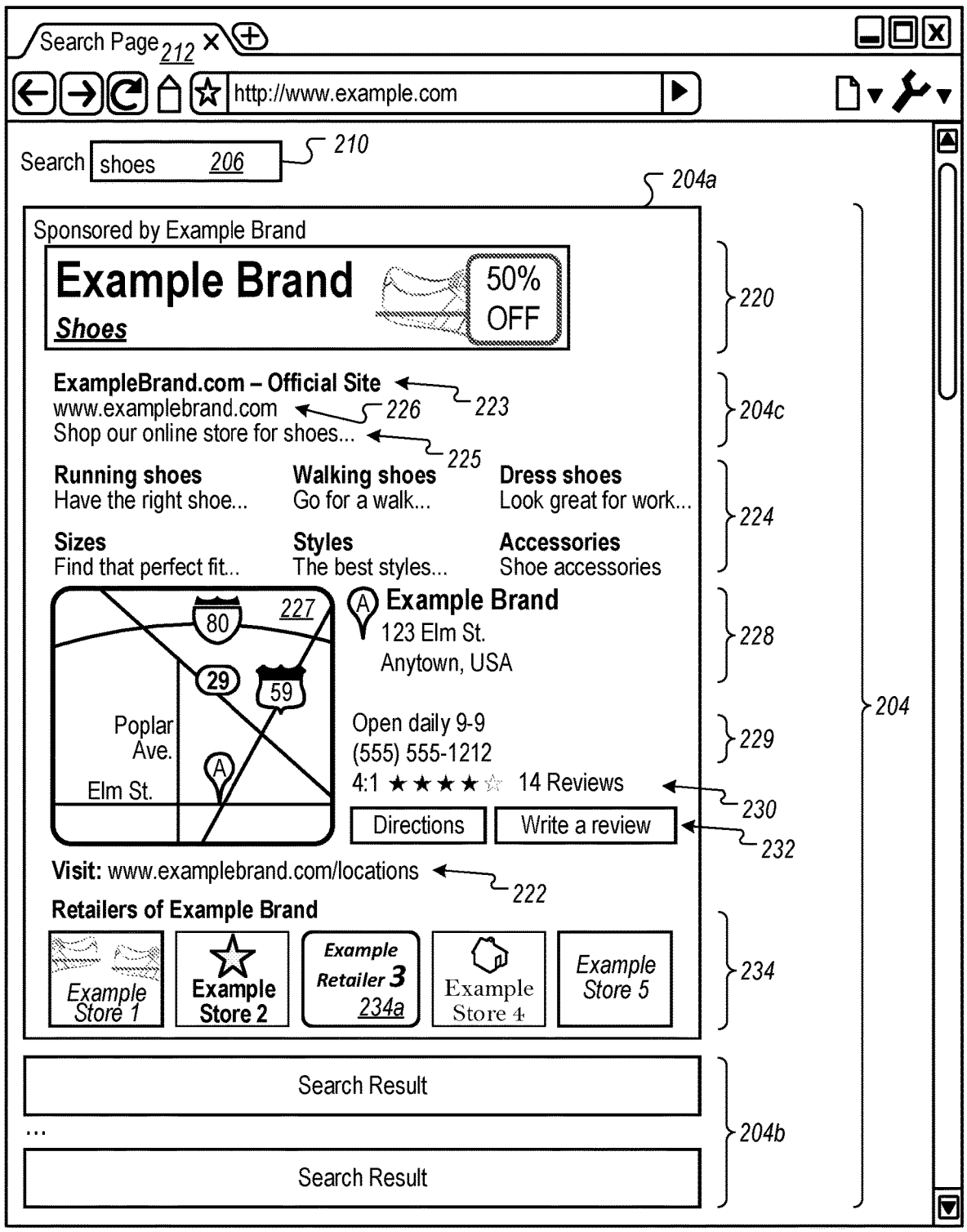
FIG. 2B shows an example combined content item.

FIG. 2B shows an example combined content item. For example, in response to the search query 206 (e.g., "shoes") entered in the query control 210, the content management system 110 has provided the search result entry 204a as the first entry among the search results 204. Search results 204 also include other search results 204b. The search result entry 204a in this example is a combined content item that includes content 204c from a search result (e.g., related Example Brand shoes) matching the search query 206. In this example, the content 204c for the search result includes a title 223, a landing page link 226, and a snippet 225. The content 204c has been combined into a combined content item (e.g., the search result entry 204a) using content from the content item 216a, (e.g., an advertisement for Example Brand shoes).

In the example shown, the search result entry 204a is a combined content item that includes, from the content item 216a, an advertisement image 220, a visual URL 222, text 224, the landing page link 226, a map 227, a physical address 228, business hours 229, review information 230, controls 232 (e.g., for obtaining map directions or writing a review), and retailer information 234. Other types and formats of content can be included in a combined content item, including, for example, audio, video, animation, content obtained from social networks, and other content.

Figure 3A:
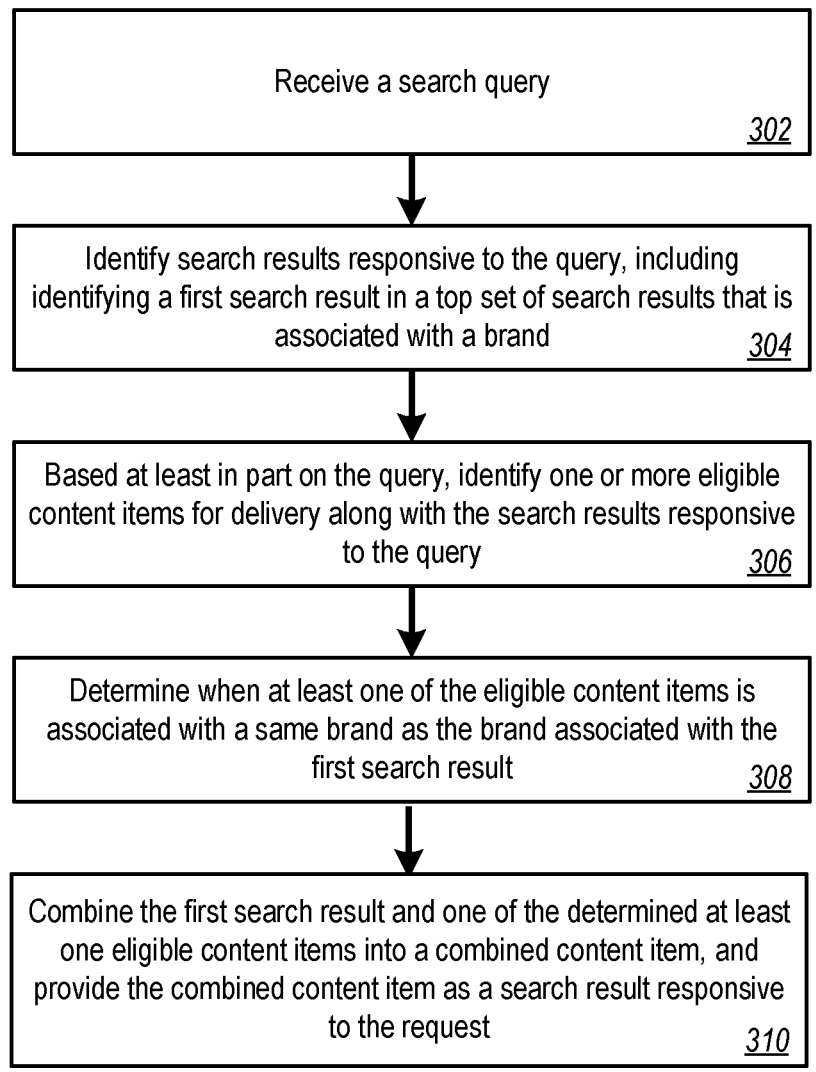
FIG. 3A is a flowchart of an example process for creating a combined content item using information from a content item associated with a same brand.

FIG. 3A is a flowchart of an example process 300 for creating a combined content item using information from a content item associated with a same brand. In some implementations, the content management system 110 can perform stages of the process 300 using instructions that are executed by one or more processors. FIGS. 1-2B are used to provide example structures for performing the stages of the process 300.

A search query is received (302). For example, the request handler 124 can receive the search query 206 (e.g., "shoes") from the user device 106. The search query 206, for example, can be entered by the user 208 in a query control 210 on the web page 212.

Search results responsive to the query are identified, including identifying a first search result in a top set of search results that is associated with a brand (304). For example, the content identification engine 121 can identify search results 214 that are responsive to terms and phrases in the search query 206. The identified search results 214 can be obtained, for example, using an index, such as described above with reference to FIG. 1. The identified search results 214 can include the first search result 214a, e.g., that is associated with Example Brand shoes. The identified search results 214 can also include other search results that may be associated with the same brand, other different brands, or no brand at all. In some implementations, the first search result (e.g., first search result 214a) that is identified can be the top search result, e.g., the first entry of the search results 118 that are responsive to the query 116. In some implementations, the first search result can be a search results entry that is not the top result (e.g., a second result, or a different result on a same page).

Based at least in part on the query, one or more eligible content items are identified for delivery along with the search results responsive to the query (306). As an example, the content identification engine 121 can identify eligible content items 216, such as advertisements or other sponsored content, that are to be presented with the search results 214 and that are selected, at least based in part, on the search query 206. The advertisements can include, for example, at least one advertisement for Example Brand shoes and other advertisements for brands that are different from Example Brand.

A determination is made when at least one of the eligible content items is associated with a same brand as the brand associated with the first search result (308). The entity/brand determination engine 122, for example, can make a determination as to whether one or more of the eligible content items 216 is associated with a same brand (e.g., Example Brand shoes) as the first search result 214a. For example, the entity/brand determination engine 122 can determine that content item 216a, e.g., an advertisement for Example Brand shoes, is associated with Example Brand shoes. There can be other brand-related matches between the eligible content items 216 and other ones of the search results 214.

In some implementations, determining when the at least one of the eligible content items is associated with a same brand can include determining that one content item is sponsored by an owner of the brand. For example, the entity/brand determination engine 122 can determine that the content item 216a (e.g., the advertisement for Example Brand shoes) is owned, e.g., by Example Brand Inc., who may also be the content sponsor 108 for the Example Brand shoes advertisement.

In some implementations, determining when at least one of the eligible content items is associated with a same brand can include determining that one eligible content item is associated with a retailer associated with the brand. For example, one or more of the content item 216a (e.g., the advertisement for Example Brand shoes) and the first search result 214a can be associated with the same retailer, e.g., a retailer that corresponds to retailer information 234a.

The first search result and one of the determined at least one eligible content items are combined into a combined content item, and the combined content item is provided as a search result responsive to the request (310). For example, the content item combination engine 123 can create the combined content item 202 (e.g., a single unit presentable with search results) that is a combination of the first search result 214a and the content item 216a that are both associated with the same Example Brand shoes brand.

In some implementations, combining includes combining a visual universal resource locator (VisURL), a title, text from the determined one eligible content item, or a link to a landing page from the determined one eligible content item into the combined content item. For example, the combined content item 202 that is created by the content item combination engine 123 can include the visual URL 222, text 224 and a landing page link 226. The combined content item 202 can also include content 204c, which can include some or all of the first search result 214a. In some implementations, there can be some overlap of content in the first search result 214a and the content item 216a, such as the same link to a same landing page. In some implementations, duplicative information is not included in a combined content item.

In some implementations, combining can include combining other information associated with the brand in the combination content item. For example, the combined content item 202 can also include a map 227 to one or more retail locations associated with brand retail presence, retailer information 234 associated with the brand and that can provide actionable links for retailers of, or associated with, the brand (e.g., Example Brand shoes). Other information can also be included, such as a physical address 228, business hours 229, and rating information 230.

In some implementations, combining can include designating content from the at least one eligible content item that is included in the combined content item as sponsored content. For example, the content item combination engine 123 can specify that the combined content item 202 be sponsored content that is included with the search results 204.

In some implementations, combined content items can be presented in a way that indicates at least a partial sponsorship. For example, combined content items can be presented for display using a special font, a special block, a different background, or some other visual different from other content items.

In some implementations, the process 300 can further include monetizing interactions with material that is included from the at least one eligible content item that is included in the combined content item based on user interactions with the material. For example, once the combined content item 202 is provided as the search result entry 204a, the content management system 110 can monetize the search result entry 204a as if it is the same content item 202. In some implementations, the monetization can occur at a different rate (e.g., a special combined content item rate) than a standard rate that would apply to the content item 216a.

Figure 3B:
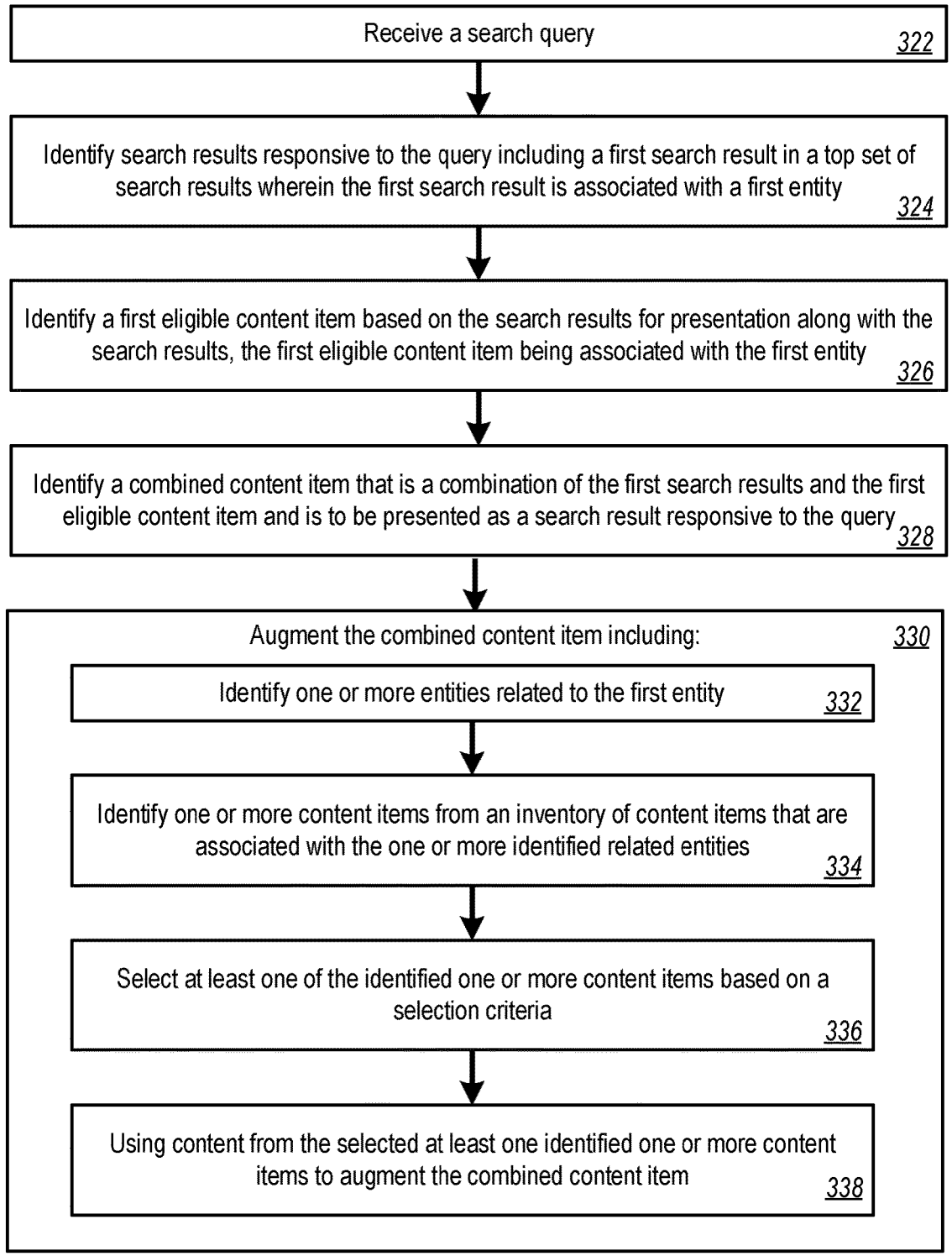
FIG. 3B is a flowchart of an example process for creating a combined content item using information from a content item associated with a related entity

FIG. 3B is a flowchart of an example process 320 for creating a combined content item using information from a content item associated with a related entity. In some implementations, the content management system 110 can perform stages of the process 320 using instructions that are executed by one or more processors. FIGS. 1-2B are used to provide example structures for performing the stages of the process 320.

A search query is received (322). For example, the request handler 124 can receive the search query 206 (e.g., "shoes") from the user device 106. The search query 206, for example, can be entered by the user 208 in a query control 210 on the web page 212.

Search results responsive to the query are identified including a first search result in a top set of search results (324). The first search result can be associated with a first entity (e.g., a brand). As an example, the content identification engine 121 can identify search results 214 that are responsive to terms and phrases in the search query 206. The identified search results 214 can be obtained, for example, using an index, such as described above with reference to FIG. 1. The identified search results 214 can include the first search result 214a, e.g., that is associated with Example Brand shoes. The identified search results 214 can also include other search results that may be associated with the same brand, other different brands, or no brand at all. In some implementations, the first search result 214a that is identified can be the top search result among a top set of search results 118 (e.g., displayed on a first page) that are responsive to the query 116. In some implementations, the first search result can be a search results entry that is not the top result (e.g., a second search results entry, or a different search results entry on a same page).

A first eligible content item is identified based on the search results for presentation along with the search results (326). The first eligible content item is associated with the first entity. As an example, the content identification engine 121 can identify eligible content items 216, such as advertisements or other sponsored content, that are selected, at least based in part, on the search query 206. From the eligible content items 216, the content identification engine 121 can identify the content item 216a that is to be presented with the search results 214. The advertisements can include, for example, at least one advertisement related to the Example Brand shoes entity and other advertisements for brands that may or may not be the same as Example Brand.

In some implementations, the first eligible content item can be sponsored by an owner of the brand. For example, the owner of the brand Example Brand Shoes can be the content sponsor 108 associated with the content item 216a.

A combined content item is identified that is a combination of the first search result and the first eligible content item and is to be presented as a search result responsive to the query (328). As an example, the content item combination engine 123 can create the combined content item 202 (e.g., a single unit presentable with search results) using the first search result 214a and the content item 216a.

The combined content item is augmented (330). For example, the content item combination engine 123 can augment the combined content item 202 using content from the at least one other content item, as described in the following stages.

One or more entities related to the first entity are identified (332). As an example, the entity/brand determination engine 122 can identify other entities 133 that are related to the entity associated with Example Brand shoes. The related entities can include, for example, entities that are commercially related to the brand, such as retailers for the brand (e.g., brick-and-mortar or online stores that sell Example Brand shoes).

In some implementations, identifying one or more related entities can include using a graph of related entities to determine one or more commercially related entities. For example, the entity/brand determination engine 122 can use one or more graphs that identify relationships among entities. Separate nodes in the graph(s), for example, can be used to represent entities. Edges on the graph(s), for example, can represent relationships between nodes, e.g., indicating that two entities are related. Other information on the nodes and edges of the graph(s) can be used, e.g., to indicate the strength of the relationships of for other purposes. Other structures besides graphs can also be used. In some implementations, knowledge graphs or other mechanisms can be used to associate various ones of products, entities, brands and other items of interest.

One or more content items are identified from an inventory of content items that are associated with the one or more identified related entities (334). For example, the content identification engine 121 can identify one or more eligible content items 131 that are associated with the related entities.

In some implementations, identifying one or more content items from an inventory of content items that are associated with the one or more identified related entities can include identifying one or more content items that are sponsored by the one or more identified related entities. For example, the content identification engine 121 can identify eligible content items 216 that are sponsored by retailers of Example Brand shoes.

At least one of the identified one or more content items is selected based on a selection criteria (336). For example, the content identification engine 121 can identify a particular one of the eligible content items 216 using selection criteria, e.g., selecting the content item 216b that is a content item related to a retailer of Example Brand shoes. Selection criteria can be the same as used when selecting the eligible content items 214 or can be different, such as to favor particular entity relationships over others (e.g., a preferred related entity).

In some implementations, selecting can include conducting an auction and using selection criteria that includes performance information related to either the one or more related entities or the identified one or more content items. For example, an auction can be used that can, for example, result in the selection of a content item related to a retailer of Example Brand shoes over other content items, e.g., based on click-through rates or other performance-related information associated with the content item.

Content from the selected at least one identified one or more content items is used to augment the combined content item (338). For example, the content item combination engine 123 can add content from the Example Brand retailer advertisement to the combined content item 202.

In some implementations, augmenting can include adding a link to a landing page associated with the one or more content items. As an example, the content item combination engine 123 can add retailer information 234, which can include clickable links to landing pages or other web pages of various retailers of Example Brand shoes.

In some implementations, augmenting can include adding a text advertisement sponsored by the one or more related entities. As an example, the content item combination engine 123 can add various ones of the components 204c, 224, 228, 229, 230 and 222 or other advertisement text from the content item 216b.

In some implementations, augmenting can include determining a format for content to be added and adding the content in accordance with the determined format. For example, the content item combination engine 123 can use format information that identifies how added content is to appear in the search result entry 204a.

Figure 4:
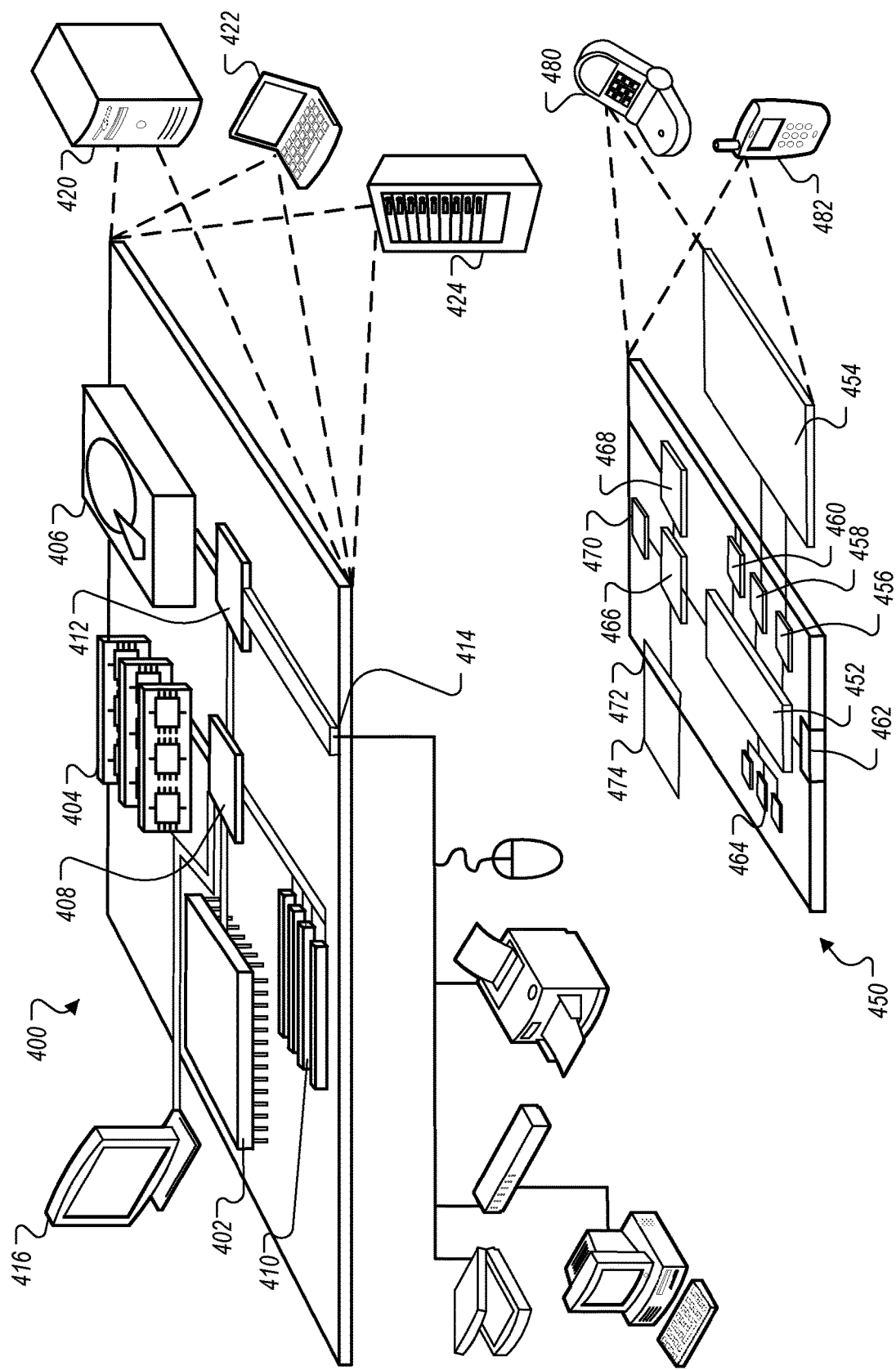
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   identifying multiple different search results responsive to a search query including a first search result in a top set of search results;
   identifying a first eligible content item of a sponsor for presentation along with the search results, wherein content of the first eligible content item includes different content than content of the first search result;
   after receiving the search query, combining, into a single combined search result, map information from the first search result and second content from the first eligible content item based on a shared characteristic, wherein the map information from the first search result is less than all of the content from the first search result;
   augmenting the single combined search result to include links to additional map information, wherein the augmenting is performed according to preferences of the sponsor previously submitted to one or more computers; and
   providing, as a search result responsive to the search query, the augmented single combined search result for display in a same search results page as multiple different search results responsive to the search query.

2. The method of claim 1, wherein identifying the first eligible content item includes determining that the first eligible content item and search results that are associated with a same brand, and wherein the map information of the single combined search result does not duplicate information that is identified in both of the first search result and the first eligible content item.

3. The method of claim 2, further comprising identifying one or more related entities that are related to the same brand.

4. The method of claim 3, wherein the one or more related entities are retailers for the same brand.

5. The method of claim 3, wherein identifying the one or more related entities includes using a graph of related entities to determine the one or more related entities.

6. The method of claim 3, wherein identifying the first eligible content item includes determining, from an inventory of content items, that the first eligible content item is sponsored by the one or more related entities.

7. The method of claim 3, wherein identifying the first eligible content item includes conducting an auction and using selection criteria that includes performance information related to either the one or more related entities or the first eligible content item.

8. The method of claim 3, wherein augmenting includes adding a text advertisement sponsored by the one or more related entities.

9. The method of claim 1, wherein augmenting includes adding a link to a landing page associated with the first eligible content item.

10. The method of claim 1, wherein augmenting includes determining a format for content to be added and adding the first eligible content item in accordance with the determined format.

11. A non-transitory computer-readable medium storing instructions, that when executed, cause one or more processors to perform operations comprising:
    identifying multiple different search results responsive to a search query including a first search result in a top set of search results;
    identifying a first eligible content item of a sponsor for presentation along with the search results, wherein content of the first eligible content item includes different content than content of the first search result;
    after receiving the search query, combining, into a single combined search result, map information from the first search result and second content from the first eligible content item based on a shared characteristic, wherein the map information from the first search result is less than all of the content from the first search result;
    augmenting the single combined search result to include links to additional map information, wherein the augmenting is performed according to preferences of the sponsor previously submitted to the one or more processors; and
    providing, as a search result responsive to the search query, the augmented single combined search result for display in a same search results page as multiple different search results responsive to the search query.

12. The non-transitory computer-readable medium of claim 11, wherein identifying the first eligible content item includes determining that the first eligible content item and search results are associated with a same brand, and wherein combined content of the single combined search result does not duplicate information that is identified in both of the first search result and the first eligible content item.

13. The non-transitory computer-readable medium of claim 12, wherein the instructions cause the one or more processors to perform operations further comprising identifying one or more related entities that are commercially related to the same brand.

14. The non-transitory computer-readable medium of claim 13, wherein the one or more related entities are retailers for the same brand.

15. A content management system comprising:
    a memory device; and
    one or more computers configured to interact with the memory device and execute instructions, wherein the instructions cause the one or more computers to perform operations comprising:

identifying multiple different search results responsive to a search query including a first search result in a top set of search results;

identifying a first eligible content item of a sponsor for presentation along with the search results, wherein content of the first eligible content item includes different content than content of the first search result;

after receiving the search query, combining, into a single combined search result, map information from the first search result and second content from the first eligible content item, wherein the map information from the first search result is less than all of the content from the first search result;

augmenting the single combined search result to include links to additional map information, wherein the augmenting is performed according to preferences of the sponsor previously submitted to the one or more computers; and providing, as a search result responsive to the search query, the augmented single combined search result for display in a same search results page as multiple different search results responsive to the search query.

16. The content management system of claim 15, wherein identification of the first eligible content item includes a determination that the first eligible content item and search results are associated with a same brand, and wherein combined content of the single combined search result does not duplicate information that is identified in both of the first search result and the first eligible content item.

17. The content management system of claim 16, further comprising an entity determination apparatus configured to determine when at least one eligible content item is associated with a same brand as a brand associated with the first search result of the search results and identify one or more related entities that are commercially related to the brand.

* * * * *